(12) United States Patent
Svigals et al.

(10) Patent No.: US 8,453,223 B2
(45) Date of Patent: May 28, 2013

(54) METHOD, DEVICE AND SYSTEM FOR SECURE TRANSACTIONS

(76) Inventors: Jerome Svigals, Redwood City, CA (US); Howard M. Svigals, Vienna, VA (US); Geoff Ingalls, Crestview, FL (US)

( * ) Notice: Subject to any disclaimer, the term of this patent is extended or adjusted under 35 U.S.C. 154(b) by 0 days.

(21) Appl. No.: 13/444,551

(22) Filed: Apr. 11, 2012

(65) Prior Publication Data

US 2013/0081122 A1    Mar. 28, 2013

Related U.S. Application Data

(60) Provisional application No. 61/626,231, filed on Sep. 23, 2011.

(51) Int. Cl.
*H04L 29/06* (2006.01)

(52) U.S. Cl.
USPC .............................. 726/7; 726/4; 726/5; 726/6

(58) Field of Classification Search
USPC .......................................................... 726/4–7
See application file for complete search history.

(56) References Cited

U.S. PATENT DOCUMENTS

| | | | |
|---|---|---|---|
| 6,250,557 B1 | 6/2001 | Forslund | |
| 7,494,055 B2 | 2/2009 | Fernandes | |
| 7,849,501 B2 | 12/2010 | Vishik | |
| 7,991,434 B2 | 8/2011 | Yen | |
| 2004/0186768 A1* | 9/2004 | Wakim | 705/14 |
| 2005/0240778 A1 | 10/2005 | Saito | |
| 2006/0031173 A1* | 2/2006 | Rajaram | 705/64 |
| 2006/0163344 A1* | 7/2006 | Nwosu | 235/380 |
| 2008/0223925 A1 | 9/2008 | Saito | |
| 2008/0282334 A1 | 11/2008 | Yves | |
| 2008/0319907 A1 | 12/2008 | Russell | |
| 2009/0104888 A1* | 4/2009 | Cox | 455/410 |
| 2010/0071031 A1 | 3/2010 | Carter | |

* cited by examiner

*Primary Examiner* — Chau Le
(74) *Attorney, Agent, or Firm* — Edward J. Radlo; Radlo IP Law Group

(57) ABSTRACT

A method for operating a security device comprises receiving a request for a transaction from a programmable device executing an application obtained from an application controlling institute, and verifying a validity of the transaction. A user is alerted, in which the user indicates an acceptance of the request. A one-time identifier is generated. The one-time identifier comprises a security device identification, a transaction number, a date and a time. The one-time identifier is communicated to the programmable device, in which the application verifies a validity of the security device identification and instructs the programmable device to communicate the one-time identifier and transaction to the application controlling institute for processing. The application controlling institute verifies validity of the one-time identifier and processes the transaction, wherein said security device, application programmable device and application controlling institute securely processes the transaction.

2 Claims, 9 Drawing Sheets

METHOD, DEVICE AND SYSTEM FOR SECURE TRANSACTIONS

CROSS-REFERENCE TO RELATED APPLICATIONS

The present Utility patent application claims priority benefit of the U.S. provisional application for patent Ser. No. 61/626,231 entitled "Smart Device for Authentication and remote Control (the SPARC device)", filed on Sep. 23, 2011, under 35 U.S.C. 119(e). The contents of this related provisional application are incorporated herein by reference for all purposes to the extent that such subject matter is not inconsistent herewith or limiting hereof.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

One or more embodiments of the invention generally relate to secure communication systems. More particularly, one or more embodiments of the invention relate to a SPARC Security Device for performing authentication and secure communication associated with a communication system.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Mobile communication devices increasingly are used for performing operations associated with privileged access such as financial transfers of funds. A lost, stolen and/or compromised unsecured communication device may result in significant harm to users and/or institutions.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that techniques built into Smart devices to provide security may include, for example, a biometric sensor built into a smart card. Also, a smart device application program which encrypts the message content from the Smart device to its controlling institution. Also, PIN accessed applications. If the Smart device is lost or stolen, the security device is included and may be manipulated by a thief.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that some prior art may use key ring devices for assorted security or operational requirements. For example, a key ring device that computes a onetime password synchronized with a central site computer or, a key ring device used to convert wireless transmission to a second type of signal.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
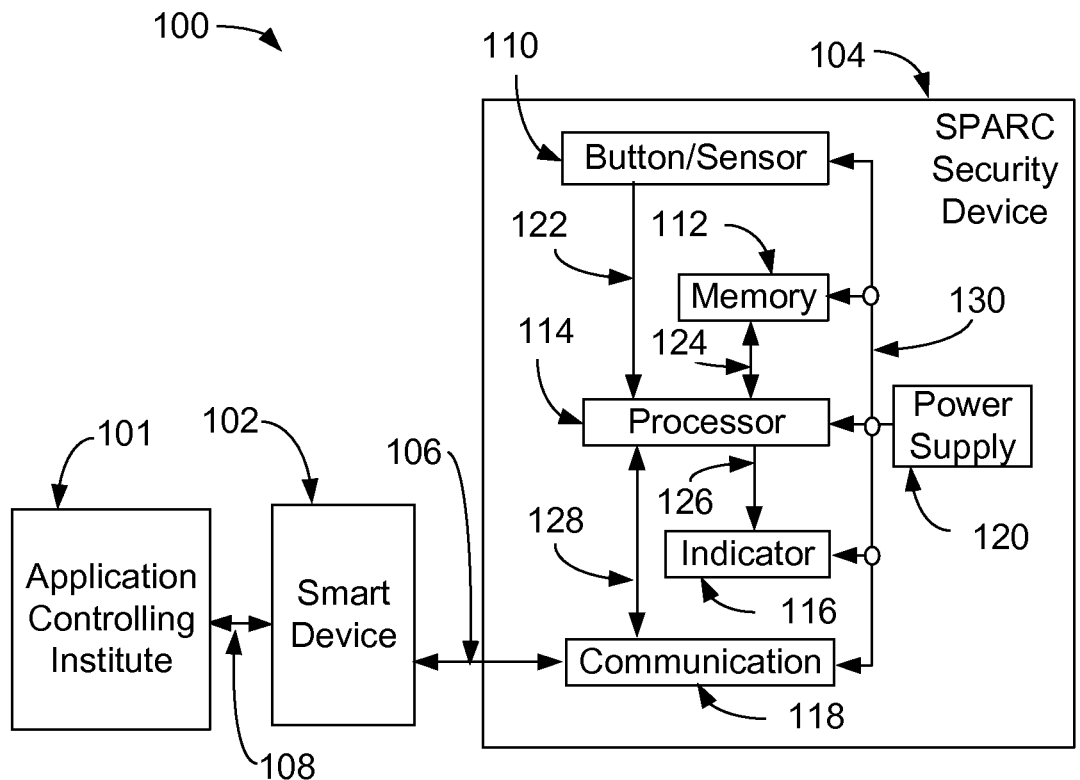
FIG. 1 is a block diagram of an example communication system, in accordance with an embodiment of the present invention.

Unless otherwise indicated illustrations in the figures are not necessarily drawn to scale.

DETAILED DESCRIPTION OF SOME EMBODIMENTS

Embodiments of the present invention are best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although claims have been formulated in this application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub combination. The Applicants hereby give notice that new claims may be formulated to such features and/or combinations of such features during the prosecution of the present application or of any further application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

A "computer" (or Smart Unit), may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device (a Smartphone) with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

"Software", or Program, may refer to prescribed rules to operate a computer. Examples of software may include: code segments in one or more computer-readable languages; graphical and or/textual instructions; applets; pre-compiled code; interpreted code; compiled code; applications and computer programs.

A "computer-readable medium" may refer to any storage device used for storing data accessible by a computer. Examples of a computer-readable medium may include: a magnetic hard disk; a floppy disk; an optical disk, such as a CD-ROM and a DVD; a magnetic tape; a flash memory; a memory chip; and/or other types of media that can store machine-readable instructions thereon.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet.

Exemplary networks may operate with any of a number of protocols, such as Internet protocol (IP), asynchronous transfer mode (ATM), and/or synchronous optical network (SONET), user datagram protocol (UDP), IEEE 802.x, etc.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing (or Smart) platform to perform the operations described herein.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

An algorithm (or application), is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

A non-transitory computer readable medium includes, but is not limited to, a hard drive, compact disc, flash memory, volatile memory, random access memory, magnetic memory, optical memory, semiconductor based memory, phase change memory, optical memory, periodically refreshed memory, and the like; however, the non-transitory computer readable medium does not include a pure transitory signal per se.

Some embodiments of the present invention will be described which provide means and methods for a secure communication system. Secure communication system includes a Smart Device with applications for communicating and interacting with a SPARC Security Device communication system enables secure communications between SPARC Security Device and external entities to secure communication system. Secure communication protocol uses a transaction identifier for protecting transmitted and received return information.

The system will now be described in detail with reference to FIGS. 1-7.

FIG. 1 is a block diagram of an example communication system, in accordance with an embodiment of the present invention.

A communication system 100 includes an Application Controlling Institute (ACI) 101, a Smart Device (SD) 102 and a SPARC Security Device (SSD) 104. The SPARC Security device (SSD) is provided by the Application Controlling Institution (ACI) when the customer orders his first ACI controlled application. The SSD is provided to match the communications protocol used by the Smart Device (SD). At the time of SSD installation, the ACI provides the initial data load of the SSD including assigned SSD number, date, time and next transaction number.

Application Controlling Institute ACI 101 communicates bi-directionally with Smart Device (SD) 102 via a communication channel 108. Smart Device (SD) 102 communicates bi-directionally with SPARC Security Device (SSD) 104 via a communication channel 106. Non-limiting examples for communication channel 106 include wireless, wired and Universal Serial Bus (USB).

Application Controlling Institute (ACI) 101 receives, transmits and process information. As a non-limiting example, Application Controlling Institute (ACI) 101 may be a financial institution.

Smart Device (SD) 102 receives, transmits and processes information. Non-limiting examples for configuration of a Smart Device (SD) 102 include smartphone, cellular phone, tabular computing device and laptop computing device.

SPARC Security Device 104 receives, transmits and processes information. Furthermore, SPARC Security Device 104 communicates information via an indicator portion and receives information via a button and/or sensor portion. As a non-limiting example, sensor may be configured as biometric.

SPARC Security Device 104 includes a button/sensor portion 110, a memory portion 112, a processor portion 114, an indicator portion 116, a communication portion 118 and a power supply portion 120.

Processor portion 114 receives information from button/sensor portion 110, signaling an agreeing with the transaction, via a communication channel 122. Processor portion 114 communicates bi-directionally with memory portion 112 via a communication channel 124. Indicator portion 116 receives information from processor portion 114 via a communication channel 126. Processor portion 114 communicates bi-directionally with communication portion 118 via a communication channel 128. Power supply portion 120 provides power to button/sensor portion 110, memory portion 112, processor portion 114, indicator portion 116 and communication portion 118 via a power supply bus 130.

Button/sensor portion 110 provides receipt of digital information (e.g. "on"/"off") and/or sensor information. Non-limiting examples for configuration of button/sensor portion 110 include biometric sensor and actuating button.

Memory portion 112 receives, stores and retrieves information. Non-limiting examples of information stored include operational codes and data.

Processor portion 114 provides receives, transmits and processes information. Non-limiting examples of information received, transmitted and processed include operational codes and data.

Indicator portion 116 provides capability for communicating information. As a non-limiting example, indicator portion 116 may be configured as a Light Emitting Diode (LED).

Communication portion 118 provides capability for receiving and transmitting information. Non-limiting examples for communication provided via communication portion 118 include wired and wireless.

Power supply portion 120 provides power for powering devices. Non-limiting examples for power supply portion 120 include battery and rechargeable battery.

SPARC Security Device 104 provides a communication and processing device for creating a secure, identifiable transaction message to an institution (e.g. bank, financial institution). Furthermore, SPARC Security Device 104 may be configured for providing a one-time identifier. Furthermore, SPARC Security Device 104 may operate to initiate an action via another device.

SPARC Security Device 104 may be configured for communicating and processing with a multiplicity of application programs associated with Smart Device 102. Furthermore, SPARC Security Device 104 contains information for supporting operation of application programs associated with Smart Device 102.

Smart Device 102 and SPARC Security Device 104 may communicate when geographically located within constraints as specified for operation associated with communication channel 106.

SPARC Security Device 104 may communicate and process information associated with a multiplicity of Smart Device 102 devices. For example, SPARC Security Device 104 may interact with a user's cellular phone device followed by interaction with the user's tabular computing device.

SPARC Security Device 104 contributes message content to messages assembled for communication from Smart Device 102 to Application Controlling Institute 101 via communication channel 108.

The combination of Smart Device 102 with SPARC Security Device 104 provides a secure method for preventing misuse or unauthorized use (e.g. fraudulent message replay, counterfeiting, etc.) of a lost or stolen Smart Device 102. Other devices aside from SPARC Security Device 104 are not capable of providing the required information to Smart Device 102 as SPARC Security Device 104 is capable of providing. Furthermore, Smart Device 102 is not capable of generating information associated with SPARC Security Device 104 to Application Controlling Institute 101 without communicating with SPARC Security Device 104.

SPARC Security Device 104 and associated processes provide secure communications based upon the interaction of the two distinct devices, Smart Device 102 and SPARC Security Device 104, needed to complete a transaction with Application Controlling Institute 101 via communication channel 108.

The two party interaction and processing associated with Smart Device 102 and SPARC Security Device 104 replaces the identification portion of the transaction information with information valid for a single transaction. Furthermore, the information is reconstituted to the unencrypted value via Application Controlling Institute 101 communicated with via communication channel 108. Furthermore, interception of the communicated information remains secure, as the received information does not provide coherent information of value. For the communication between Smart Device 102 and Application Controlling Institute 101, the real account number associated with a user account is replaced by a single transaction identifier which aids in deterring message copying and counterfeiting.

In order to generate single transaction identifier, memory portion 112 includes four registers with unencrypted values: (1) SSD (SPARC Security Device) unit identifier, (2) Message identifier, (3) Date, and (4) time. The combined value of SSD unit identifier, message identifier, date and time becomes a temporary account number, called the SSD ID identifier. The temporary account identifier replaces the true account identifier. The ACI (Application Controlling Institution) maintains an equivalent set of registers. Verification is performed for agreement between the ACI incoming message and SSD unit identifier, message identifier and date in order to be accepted. Upon receipt, message identifier associated with ACI is incremented. As a non-limiting example, message identifier is advanced by 1. Subsequent messages with the same original content and having an incorrect value for message identifier are rejected. Upon the receipt of SSD unit identifier, message identifier and date which matches, access is provided to the associated true account number stored in the ACI data base for the SSD number, for processing by ACI 101.

Smart Device 102 and SPARC Security Device 104 use unique identification data for replacing an account identifier with a single transaction identifier for communication to Application Controlling Institute 101. Non-limiting examples of unique identification data includes SPARC Security Device 104 unit identifier, transaction identifier, transaction date, transaction transmission time and, optionally, institution identifier. Application Controlling Institute 101 data base information is used for validating the communicated information to the Application Controlling Institute 101. Furthermore, Application Controlling Institute 101 maintains the true account identification information for each SSD, for use in message processing.

Communication system 100 operates via interaction of Smart Device 102, SPARC Security Device 104 and a user (not shown). If Smart Device 102 or SPARC Security Device 104 are not available to user, the processing of and communication of information to Application Controlling Institute 101 via communication channel 108 is not performed. However, for conditions of SPARC Security Device 104 not available, user may continue to use Smart Device 102 for other applications not associated with SPARC Security Device 104 (e.g. word processing, Internet browsing, etc.).

SPARC Security Device 104 supports a multiplicity of actuating devices. Non-limiting examples of actuating devices include manual, biometric (e.g. fingerprint), dual and automatic. Furthermore, the actuating device variations offer two and three factor security control. Two factor authentication is an approach to authentication involving the presentation of two different kinds of evidence for verification. Two factor authentication is associated with something a user knows and something a user is in possession. Three factor authentication includes two factor authentication with the addition of needing something related to the identity of a person (e.g. fingerprint).

SPARC Security Device 104 is a separate, self-contained device from Smart Device 102 and may be used with a multiplicity of Smart Devices 102 (e.g. cellular phone, tabular device, laptop, etc.). Furthermore, the interaction of SPARC Security Device 104 with Smart Device 102 via the multiplicity of Smart Device 102 devices may be performed via the same communications protocol.

Communication system 100 may support bump security applications. Bump supports an application operating via Smart Device 102 and by a matching algorithm operating via servers connected via communication channel 108.

SPARC Security Device 104 supports a multiplicity of security related applications operating via Smart Device 102 for communicating to Application Controlling Institute 101 accessed via communication channel 108.

Processing associated with Smart Device 102 and SPARC Security Device 104 can detect an attempt to record information communicated for additional benefit, as the processing performs verification for a multiplicity of communicated information. Non-limiting examples of information verified include message date, message identifier and message transmission time.

Smart Device 102 and SPARC Security Device 104 support message rejection by Application Controlling Institute 101 communicated via communication channel 108. Support by Smart Device 102 and SPARC Security Device 104 for messages rejected by Application Controlling Institute 101 include reprocessing and retransmitting, modification of application program or destroying a portion of an application program.

SPARC Security Device 104 supports maintenance of an audit trail for transactions initiated by SPARC Security Device 104 for communication by Smart Device 102 to Application Controlling Institute 101 via communication channel 108. As a non-limiting example, the audit trail includes the original identification information. The audit trail information is used in order to replace the original account identifiers for information communicated to communication system 100 from Application Controlling Institute 101. Audit trail information may not be used for generation of messages to Application Controlling Institute 101, as the associated information is not up-to-date or current with respect to the current time and message count content.

Processes associated with SPARC Security Device 104 may be used for securing transaction messages communicated from Application Controlling Institute 101, as information transmitted by Application Controlling Institute 101 may be compared with information contained within SPARC Security Device 104.

Transmitted message content may be verified for accuracy via parity checks. As a non-limiting example, Application Controlling Institute 101 may perform parity checks for received information. As a non-limiting example, parity checks may be performed via Cyclic Redundancy Check (CRC).

The payment credentials of a transaction are secured by replacing the account identifier with a SPARC Security Device based identification number valid for a single transaction. A transmitted message may have a single transaction identifier and the respective response may have a different single transaction identifier.

Applications for Smart Device 102 and SPARC Security Device 104 may be securely updated via the communication processes associated with Smart Device 102 and SPARC Security Device 104.

SPARC Security Device 104 provides an independent protection and controlling device which may operate with a multiplicity of devices. Furthermore, SPARC Security Device 104 may continue to be used in the event of a lost or stolen Smart Device 102.

Application Controlling Institute 101 may modify, disable, remove or destroy applications associated with Smart Device 102.

In some embodiments, functionality of SPARC Security Device 104 may be performed by a second Smart Device 102 device with second Smart Device 102 simulating the operation of SPARC Security Device 104 device.

In some embodiments, Smart Device 102 may not perform a requested action prior to configuration for operation with SPARC Security Device 104. As a non-limiting example, when an unauthorized user attempts to perform unauthorized transactions via Smart Device 102 (e.g. financial fund transfer), Smart Device 102 does not communicate with external entities until configuration and communication with SPARC Security Device 104 is performed. As a non-limiting example, unauthorized telephone toll charges may be prevented via this feature. Furthermore, this feature may be configured for functions associated with Smart Device 102 in order to support monitoring for security device surveillance. This feature enables a user to monitor and control operation of Smart Device 102.

SPARC Security Device 104 provides memory and processing for generating one-time identification for providing protection to data transmissions.

Applications receive SPARC Security Device 104 unit identifier and a pre-established transaction identifier for new application acceptance. SPARC Security Device 104 unit identifier and the transaction identifier are communicated to SPARC Security Device 104 for confirmation. If confirmed, SPARC Security Device 104 illuminates indicator portion 116 and requests actuation via button/sensor portion 110. If not confirmed SPARC Security Device 104 flash repeatedly illuminates indicator to present disapproval.

Smart Device 102 uses an access application confirmation process for preventing unauthorized access. Furthermore, access application may use biometric actuator (e.g. button/sensor portion 110) to confirm a user's access privilege.

For a lost or stolen Smart Device 102 having a valid SSD unit number, SPARC Security Device 104 is not able to create an acceptable message to ACI 101 as SPARC Security Device 104 does not have a current SSD message number, date and/or time.

When an incorrect SSD unit number is presented, the ACI application detects incorrect SSD unit number and rejects an attempted transaction.

An attempt to use multiple SPARC Security Devices with a single Smart Device results in an unusable signal received by Smart Device which results in rejection of the SPARC Security Devices.

Figure 2:
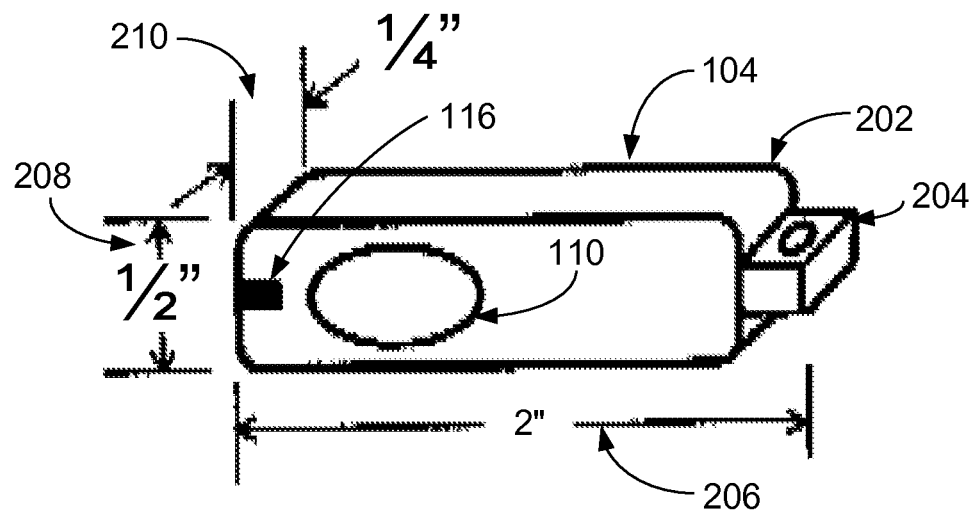
FIG. 2 is a mechanical diagram for the example SPARC Security Device described with reference to FIG. 1, in accordance with an embodiment of the present invention.

FIG. 1 is a block diagram of an example communication system for performing secure transactions between Smart Devices/SPARC Security Devices and ACI's FIG. 2 is a mechanical diagram for the example SPARC Security Device described with reference to FIG. 1, in accordance with an embodiment of the present invention.

SPARC Security Device 104 includes button/sensor portion 110, indicator portion 116, a containment portion 202 and an attachment element 204.

Containment portion 202 provides containment of associated electronic and mechanical devices associated with SPARC Security Device 104.

Attachment element 204 provides capability for attachment of SPARC Security Device 104 to other devices (e.g. keychain, key ring, etc.). Optionally, the attachment is not-limiting and may be a safety pin for attachment to clothing.

Containment portion 202 includes a length 206, a height 208 and a width 210. As a non-limiting example, length 206 may be two inches in length. As a non-limiting example, height 208 may be ½ inches in height. As a non-limiting example, width 210 may be ¼ inches in width.

FIG. 2 is a mechanical diagram for the example SPARC Security Device described with reference to FIG. 1 where a containment portion provides containment of associated electrical and mechanical devices.

Figure 3:
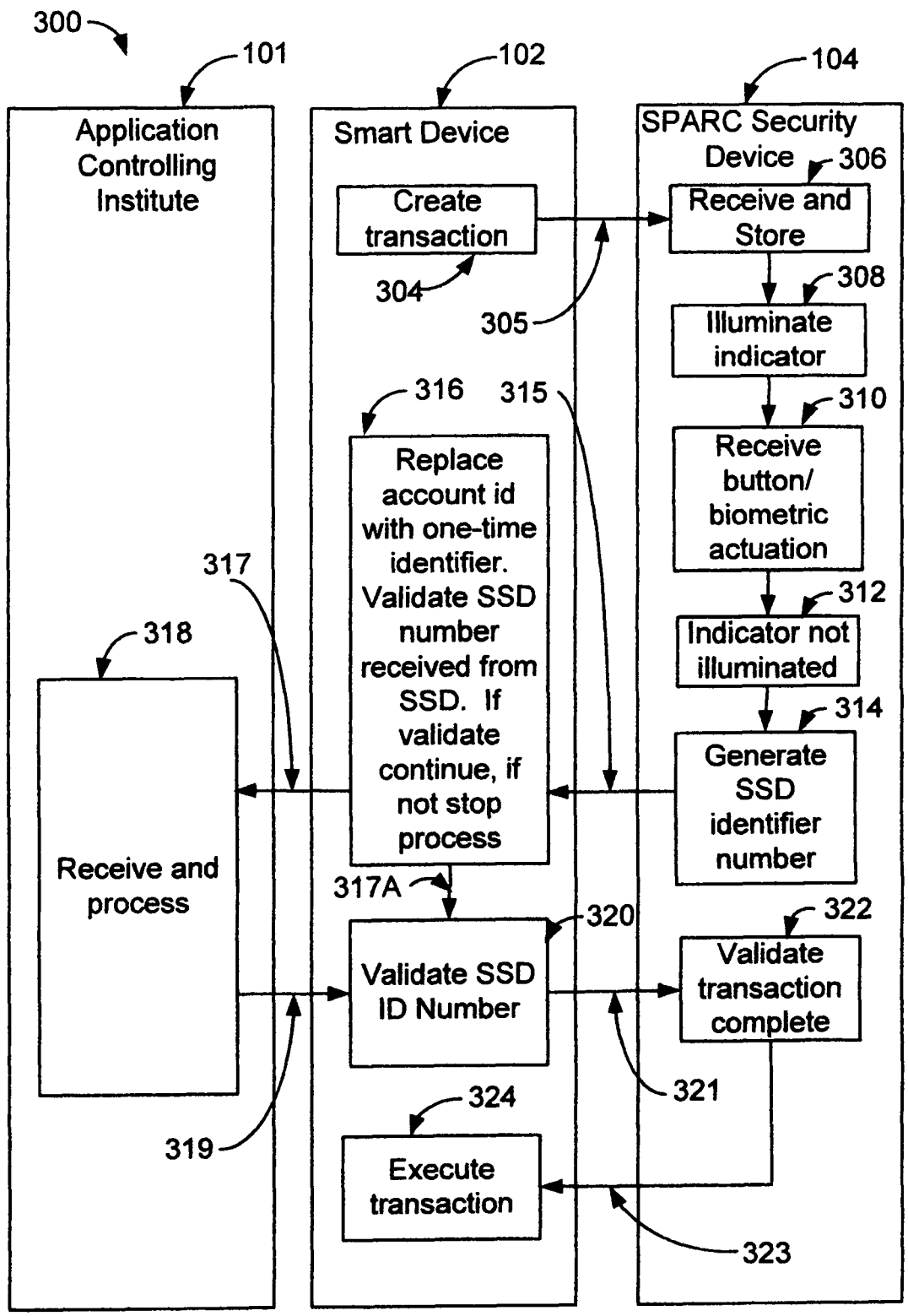
FIG. 3 is a flow diagram of the example communication system described with reference to FIGS. 1-2, in accordance with an embodiment of the present invention.

FIG. 3 is a flow diagram of the example communication system described with reference to FIGS. 1-2, in accordance with an embodiment of the present invention.

A flow diagram 300 presents the flow communication between Application Controlling Institute 101, Smart Device 102 and SPARC Security Device 104.

Application associated with Smart Device 102 requests a transaction with Application Controlling Institute 101. Non-limiting examples of information communicated from Smart Device 102 to Application Controlling Institute 101 include account identifier, Application Controlling Institute designation, transaction type, fund type requested, requested fund amount, currency type (e.g. U.S. dollars), Smart Device communications address and transaction password for routine security.

For an event 304 associated with Smart Device 102, user selects to create a transaction. As a non-limiting example, transaction may be initiated via selection of a transmit button, and for any transaction using the SEND function. Transmit application activated as a result of selecting transmit button. Smart Device 102 communicates an information 305 to SPARC Security Device 104. Non-limiting examples of information communicated includes account identifier and transaction type.

For an event 306, SPARC Security Device 104 stores in memory received account identifier and transaction type. For an event 308, SPARC Security Device 104 illuminates indicator portion 116 as described with reference to FIG. 1. For an event 310, SPARC Security Device 104 receives an indication of button/sensor portion 110 actuation. For an event 312, illumination of indicator portion 116 is terminated.

For an event 314 a SSD ID identifier is created by SPARC Security Device 104. Non-limiting examples of information associated with SSD ID identifier include SPARC Security Device 104 transaction code, SPARC Security Device 104 unit identifier, date, time and SPARC Security Device 104 security device transaction identifier. Furthermore, SSD ID identifier associated with an information 315 is communicated to Smart Device 102.

For an event 316, Smart Device 102 receives and processes information 315 in order to generate one-time identifier from received account identifier. Furthermore, Smart Device 102 validates SSD number received from SSD 104. If valid process continues, if not, processes terminates. Furthermore, Smart Device 102 communicates an information 317 associated with one-time identifier to Application Controlling Institute 101.

For an event 318, Smart Device 102 receives and processes information 317. Smart Device 102 uses SPARC Security Device 104 unit identifier for retrieving information from an ACI database associated with a transaction identifier. Furthermore, Smart Device 102 performs a comparison of the retrieved transaction identifier with the transaction identifier received via information 317 in order to verify information 317 is valid. Furthermore, Smart Device 102 may also validate information 317 via date and time. Furthermore, Smart Device 102 retrieves an account identifier from database via 317A for performing transaction processing. Furthermore, transaction is processed and an information 319 is prepared and communicated to Smart Device 102. As a non-limiting example, information 319 includes SPARC Security Device 104 security device identifier for validating information 319 by Smart Device 102.

For an event 320, Smart Device 102 validates transaction. Using information 317A. 104. Smart Device 102 transmits an information 321 to SPARC Security Device 104 for validation. Information 317A provides a copy of information 317 to validate the return message from the ACI 101.

For an event 322, SPARC Security Device 104 validates transaction for completion. As a non-limiting example, SPARC Security Device 104 validates the received unit identifier is correct. Furthermore, event 322 communicates an information 323 to Smart Device 102. As a non-limiting example, information 323 includes a signal communicating Smart Device 102 to execute transaction. As a non-limiting example, executing transaction may include accepting funds associated with a bank account.

For an event 324, Smart Device 102 executes transaction. As a non-limiting example, Smart Device 102 posts funds received associated with application.

FIG. 3 is a flow diagram of the example communication system described with reference to FIG. 1-2 where a transaction associated with an Application Controlling Institute, Smart Device and SPARC Security Device is securely executed.

Figure 4A:
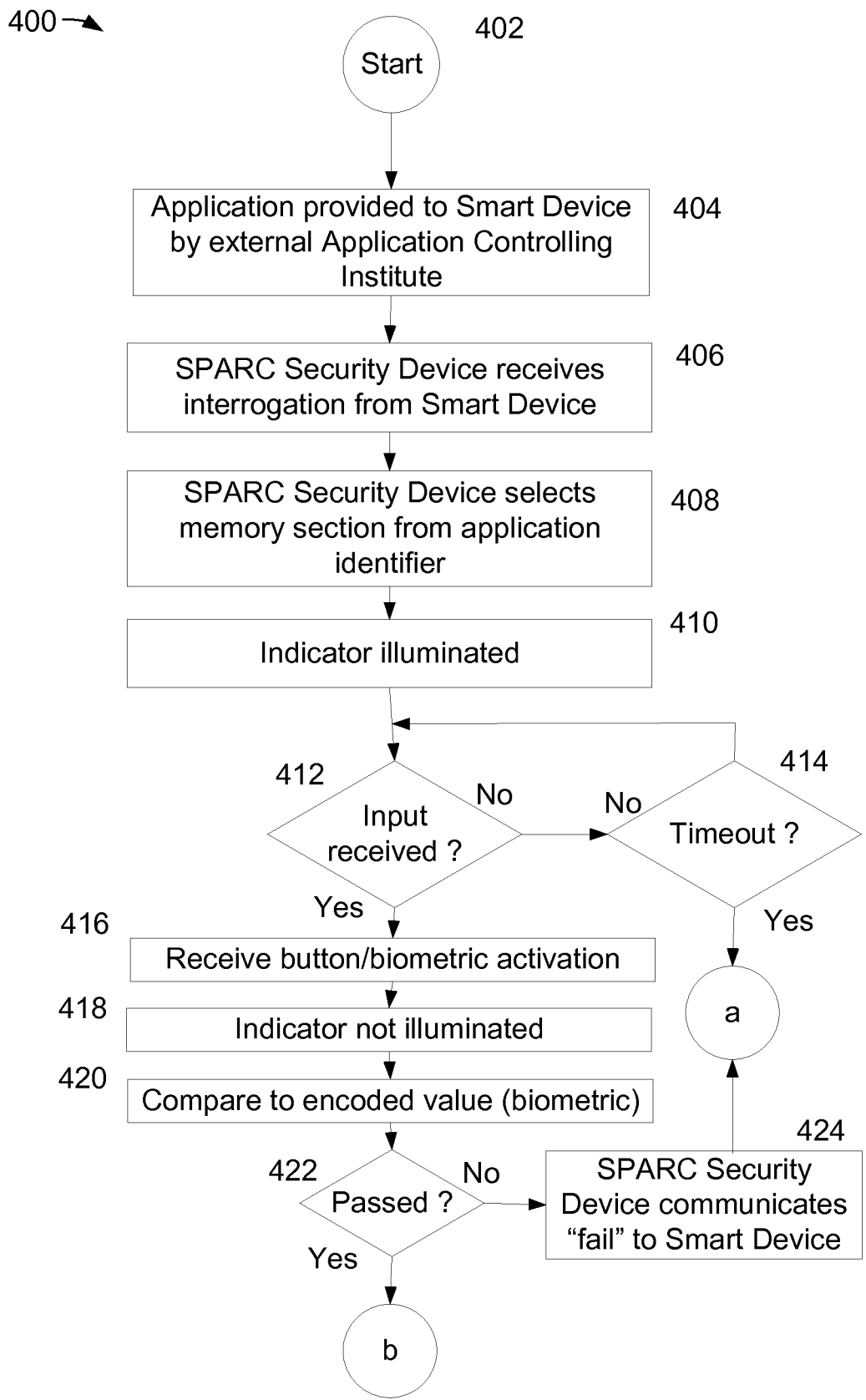
FIGS. 4A-C illustrate an example method for the communication system as described with reference to FIGS. 1-3, in accordance with an embodiment of the present invention.
Figure 4B:
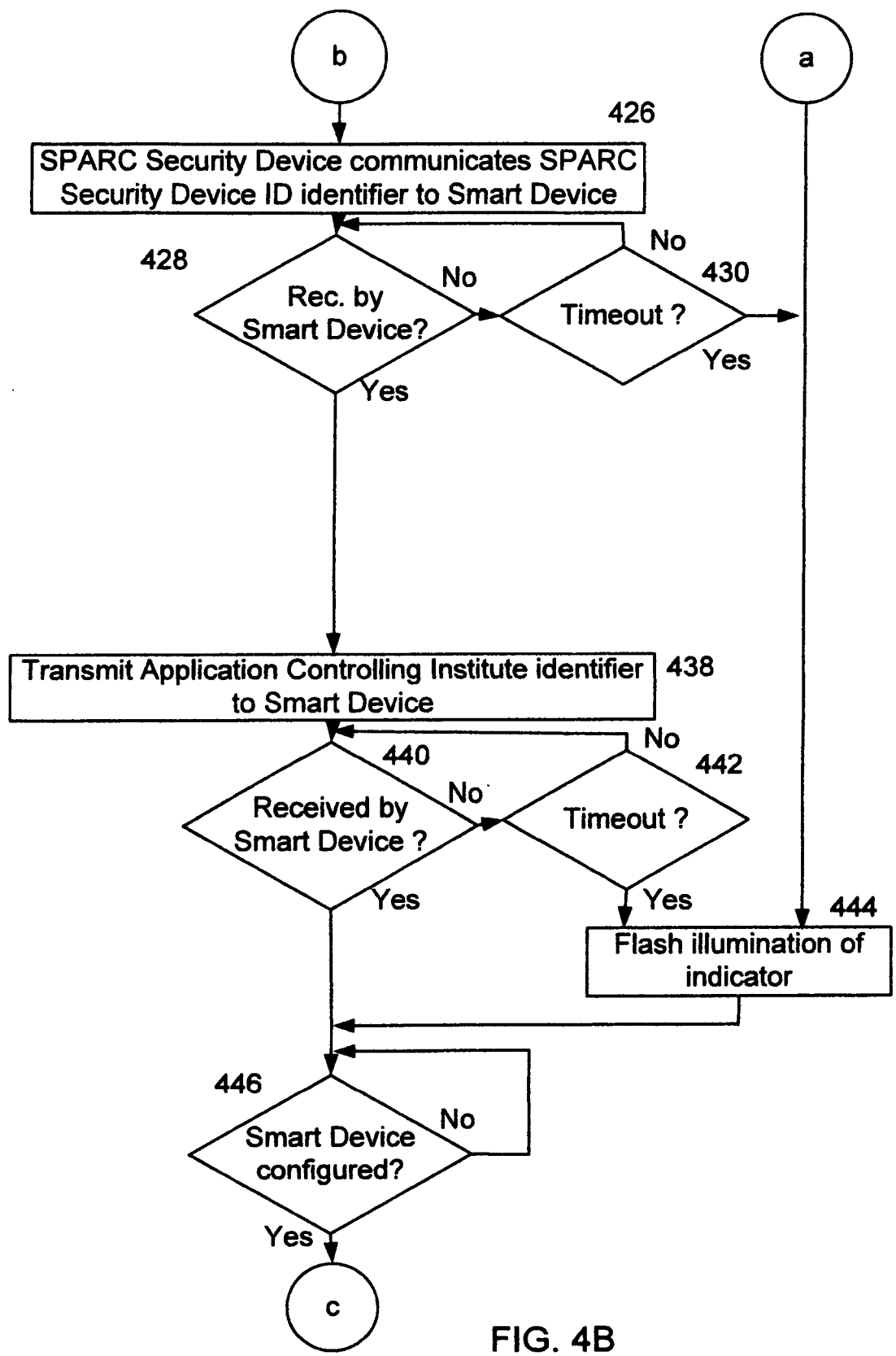
Figure 4C:
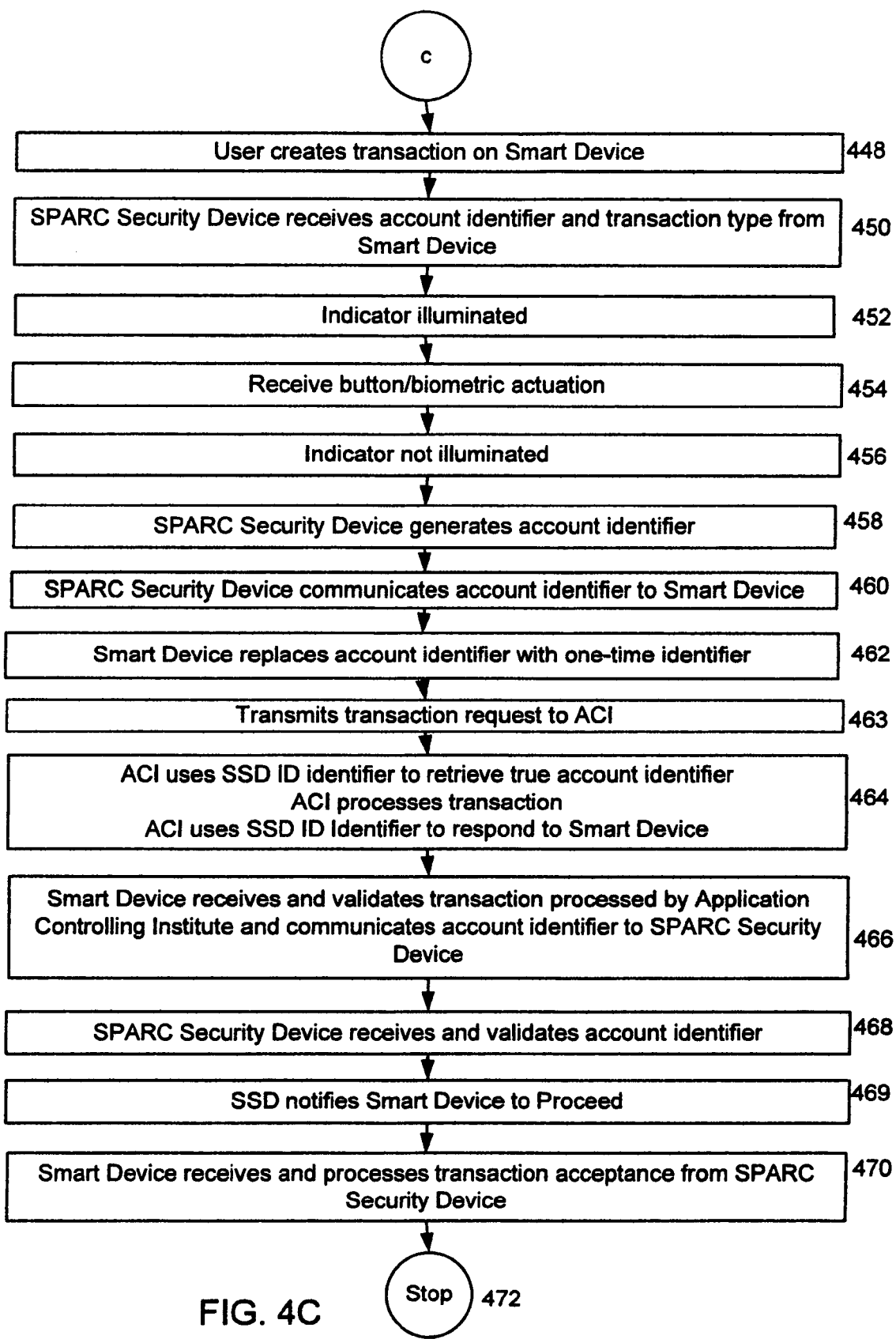

FIGS. 4A-C illustrate an example method for the communication system as described with reference to FIGS. 1-3, in accordance with an embodiment of the present invention.

Referring to FIG. 4A, a method 400 initiates in a step 402.

Then in a step 404, application is provided to Smart Device by Application Controlling Institute.

As a non-limiting example, Smart Device 102 (FIG. 1) receives an application from Application Controlling Institute via communication channel 108 (FIG. 1).

Referring back to FIG. 4A, then in a step 406 SPARC Security Device receives interrogation from Smart Device.

As a non-limiting example, SPARC Security Device 104 (FIG. 1) receives an interrogation message from Smart Device 102 (FIG. 1) via communication channel 106 (FIG. 1).

Referring back to FIG. 4A, then in a step 408 SPARC Security Device selects memory section associated with application identifier for received application.

As a non-limiting example, SPARC Security Device 104 (FIG. 1) selects a memory section associated with memory portion 112 (FIG. 1) associated with application identifier.

Referring back to FIG. 4A, then in a step 410 indicator is illuminated.

As a non-limiting example, indicator portion 116 (FIGS. 1-2) is illuminated.

Referring back to FIG. 4A, then in a step 412 determination for input received from button/sensor is performed.

For a determination of no input received in step 412, in a step 414 a determination is performed for a timeout condition.

For a determination of no timeout in step 414, execution of method 400 transitions to step 412.

For a determination of an input received in step 412, in a step 416, activation associated with button/sensor is received by SPARC Security Device.

As a non-limiting example, processor portion 114 (FIG. 1) receives an indication from button/sensor portion 110 (FIG. 1) via communication channel 122 (FIG. 1).

Referring back to FIG. 4A, then in a step 418 illumination of indicator is terminated.

As a non-limiting example, illumination of indicator portion 116 (FIG. 1) is terminated.

Referring back to FIG. 4A, then in a step 420 a comparison is performed between received biometric information and stored biometric information to authenticate user performing actuation of sensor.

As a non-limiting example, biometric information (e.g. finger print) provided by button/sensor portion 110 (FIG. 1) is compared with biometric information stored in memory portion 112 (FIG. 1) by processor portion 114 (FIG. 1).

Referring back to FIG. 4A, then in a step 422 a determination for pass/fail for the biometric comparison performed in step 420 is performed.

For a determination of fail in step 422, in a step 424, SPARC Security Device communicates a failure message to Smart Device 102.

As a non-limiting example, SPARC Security Device 104 (FIG. 1) communicates a failure message to Smart Device 102 (FIG. 1) via communication channel 106 (FIG. 1).

Referring back to FIG. 4A, for a determination of pass in step 422, in a step 426, illustrated with reference to FIG. 4B, SPARC Security Device communicates SPARC Security Device unit identifier to Smart Device.

As a non-limiting example, SPARC Security Device 104 (FIG. 1) communicated the unit identifier associated with SPARC Security Device 104 (FIG. 1) to Smart Device 102 (FIG. 1).

Referring back to FIG. 4B, then in a step 428, a determination for Smart Device receiving SPARC Security Device unit identifier from SPARC Security Device is performed.

For a determination of Smart Device not receiving SPARC Security Device unit identifier in step 428, in a step 430, a determination for a timeout condition is performed.

For a determination of not a timeout condition in step 430, execution of method 400 transitions to step 428.

For a determination of receiving SPARC Security Device unit identifier in step 428, in a step 438, Application Controlling Institute identifier is communicated from Application Controlling Institute to Smart Device.

In a step 440, a determination for receipt of Application Controlling Institute identifier is performed by Smart Device.

For a determination of not receiving Application Controlling Institute identifier by Smart Device in step 440, in a step 442, a determination for a timeout condition is performed.

For a determination of not a timeout condition in step 442, execution of method 400 transitions to step 440.

Following SPARC Security Device communicating fail to Smart Device in step 424 (FIG. 4A), determination of a timeout in step 414 (FIG. 4A), step 430 (FIG. 4B) and 442 (FIG. 4B), in a step 444 (FIG. 4B) indicator portion 116 (FIGS. 1-2) is illuminated in a flashing manner.

Referring back to FIG. 4B, following flash illumination of indicator in step 444 and for a determination of receiving an Application Controlling Institute identifier in step 440, in a step 446 a determination for a configured Smart Device is performed.

For a determination of a not configured Smart Device in step 446, execution of method 400 returns to step 446.

For a determination of a configured Smart Device in step 446, in a step 448, as illustrated with reference to FIG. 4C, user creates a transaction on Smart Device 102 (FIG. 1) as described with reference to event 304 (FIG. 3).

Referring back to FIG. 4C, then in a step 450 SPARC Security Device received account identifier and transaction type from Smart Device. In some embodiments, response to the transaction request may be discrete data or a continuous data stream, or both.

As a non-limiting example, SPARC Security Device 104 (FIG. 1) receives account identifier and transaction type from Smart Device 102 (FIG. 1) as described with reference to event 306 (FIG. 3).

Referring back to FIG. 4C, then in a step 452 indicator is illuminated.

As a non-limiting example, indicator portion 116 (FIGS. 1-2) is illuminated as described with reference to event 308 (FIG. 3).

Referring back to FIG. 4C, then in a step 454 SPARC Security Device receives actuation information associated with button/sensor.

As a non-limiting example, processor portion 114 (FIG. 1) receives information associated with actuation of button/sensor portion 110 (FIG. 1) via communication channel 122 (FIG. 1) as described with reference to event 310 (FIG. 3).

Referring back to FIG. 4C, then in a step 456 illumination of indicator is terminated as described with reference to event 314 (FIG. 3).

Then in a step 458, SPARC Security Device 104 generates SSD ID identifier as described with reference to event 314 (FIG. 3).

Referring back to FIG. 4C, then in a step 460 SPARC Security Device communicates SSD ID identifier to Smart Device as described with reference to information 315 (FIG. 3).

Referring back to FIG. 4C, then in a step 462 Smart Device replaces SSD ID identifier with one-time SSD identifier as described with reference to event 316 (FIG. 3). In step 463 Smart Device transmits transaction request to ACI.

Referring back to FIG. 4C, then in a step 464 Application Controlling Institute (ACI) uses the SSD ID identifier to retrieve the account number. ACI processes the transaction. In some embodiments, a transaction request passes through the ACI to a second ACI for evaluation or action. ACI uses SSD ID identifier to respond to smart device with reference to event 318 (FIG. 3).

Referring back to FIG. 4C, then in a step 466 Smart Device receives and validates transaction processed by Application Controlling Institute and communicates SSD ID identifier to SPARC Security Device as described with reference to event 320 (FIG. 3).

Referring back to FIG. 4C, then in a step 468 SPARC Security Device receives and validates second one-time SSD ID identifier as described with reference to event 322 (FIG. 3). In step 469, SPARK Security Device notifies Smart Device to proceed.

Referring back to FIG. 4C, then in a step 470 Smart Device receives and processes transaction acceptance from SPARC Security Device as described with reference to event 324 (FIG. 3).

Referring back to FIG. 4C, then in a step 472 execution of method 400 terminates.

FIGS. 4A-C illustrate an example method for the communication system as described with reference to FIGS. 1-3 where an Application Controlling Institute, Smart Device and SPARC Security Device communicate and process information for performing a transaction.

Figure 5:
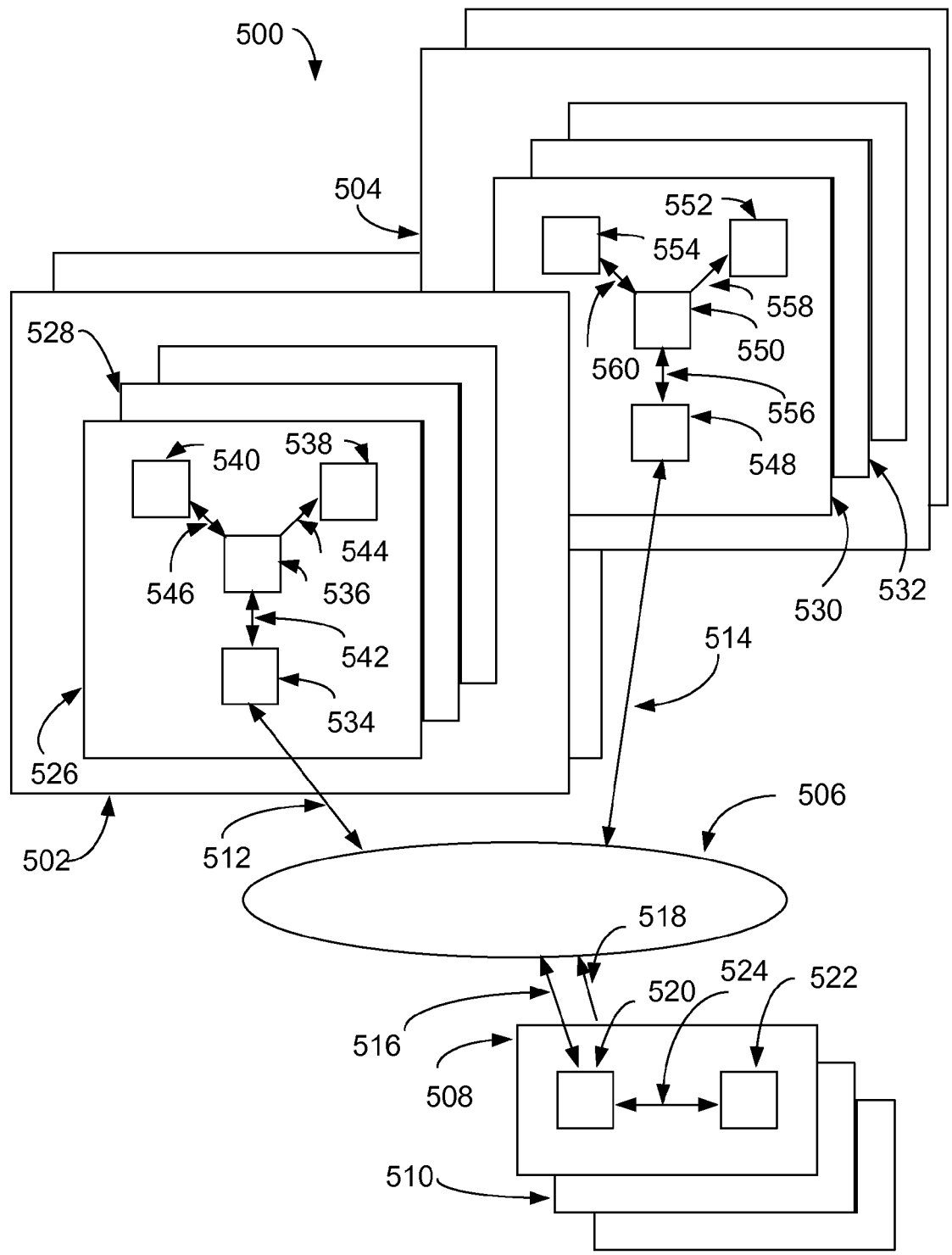
FIG. 5 illustrates a block diagram depicting a conventional client/server communication system.

FIG. 5 illustrates a block diagram depicting a conventional client/server communication system.

A communication system 500 includes a multiplicity of networked regions with a sampling of regions denoted as a network region 502 and a network region 504, a global network 506 and a multiplicity of servers with a sampling of servers denoted as a server device 508 and a server device 510.

Network region 502 and network region 504 may operate to represent a network contained within a geographical area or region. Non-limiting examples of representations for the geographical areas for the networked regions may include postal zip codes, telephone area codes, states, counties, cities and countries. Elements within network region 502 and 504 may operate to communicate with external elements within other networked regions or within elements contained within the same network region.

In some implementations, global network 506 may operate as the Internet. It will be understood by those skilled in the art that communication system 500 may take many different forms. Non-limiting examples of forms for communication system 500 include local area networks (LANs), wide area networks (WANs), wired telephone networks, cellular telephone networks or any other network supporting data communication between respective entities via hardwired or wireless communication networks. Global network 506 may operate to transfer information between the various networked elements.

Server device 508 and server device 510 may operate to execute software instructions, store information, support database operations and communicate with other networked elements. Non-limiting examples of software and scripting languages which may be executed on server device 508 and server device 510 include C, C++, C# and Java.

Network region 502 may operate to communicate bi-directionally with global network 506 via a communication channel 512. Network region 504 may operate to communicate bi-directionally with global network 506 via a communication channel 514. Server device 508 may operate to communicate bi-directionally with global network 506 via a communication channel 516. Server device 510 may operate to communicate bi-directionally with global network 506 via a communication channel 518. Network region 502 and 504, global network 506 and server devices 508 and 510 may operate to communicate bi-directionally and also communicate bi-directionally with other networked device located within communication system 500.

Server device 508 includes a networking device 520 and a server 522. Networking device 520 may operate to communicate bi-directionally with global network 506 via communication channel 516 and with server 522 via a communication channel 524. Server 522 may operate to execute software instructions and store information.

Network region 502 includes a multiplicity of clients with a sampling denoted as a client 526 and a client 528. Client 526 includes a networking device 534, a processor 536, a GUI 538 and an interface device 540. Non-limiting examples of devices for GUI 538 include monitors, televisions, cellular telephones, smartphones and PDAs (Personal Digital Assistants). Non-limiting examples of interface device 540 include pointing device, mouse, trackball, scanner and printer. Networking device 534 may communicate bi-directionally with global network 506 via communication channel 512 and with processor 536 via a communication channel 542. GUI 538 may receive information from processor 536 via a communication channel 544 for presentation to a user for viewing. Interface device 540 may operate to send control information to processor 536 and to receive information from processor 536 via a communication channel 546. Network region 504 includes a multiplicity of clients with a sampling denoted as a client 530 and a client 532. Client 530 includes a networking device 548, a processor 550, a GUI 552 and an interface device 554. Non-limiting examples of devices for GUI 538 include monitors, televisions, cellular telephones, smartphones and PDAs (Personal Digital Assistants). Non-limiting examples of interface device 540 include pointing devices, mousse, trackballs, scanners and printers. Networking device 548 may communicate bi-directionally with global network 506 via communication channel 514 and with processor 550 via a communication channel 556. GUI 552 may receive information from processor 550 via a communication channel 558 for presentation to a user for viewing. Interface device 554 may operate to send control information to processor 550 and to receive information from processor 550 via a communication channel 560.

For example, consider the case where a user interfacing with client 526 may want to execute a networked application. A user may enter the IP (Internet Protocol) address for the networked application using interface device 540. The IP address information may be communicated to processor 536 via communication channel 546. Processor 536 may then communicate the IP address information to networking device 534 via communication channel 542. Networking device 534 may then communicate the IP address information to global network 506 via communication channel 512. Global network 506 may then communicate the IP address information to networking device 520 of server device 508 via communication channel 516. Networking device 520 may then communicate the IP address information to server 522 via communication channel 524. Server 522 may receive the IP address information and after processing the IP address information may communicate return information to networking device 520 via communication channel 524. Networking device 520 may communicate the return information to global network 506 via communication channel 516. Global network 506 may communicate the return information to networking device 534 via communication channel 512. Networking device 534 may communicate the return information to processor 536 via communication channel 542. Processor 536 may communicate the return information to GUI 538 via communication channel 544. User may then view the return information on GUI 538.

Figure 6:
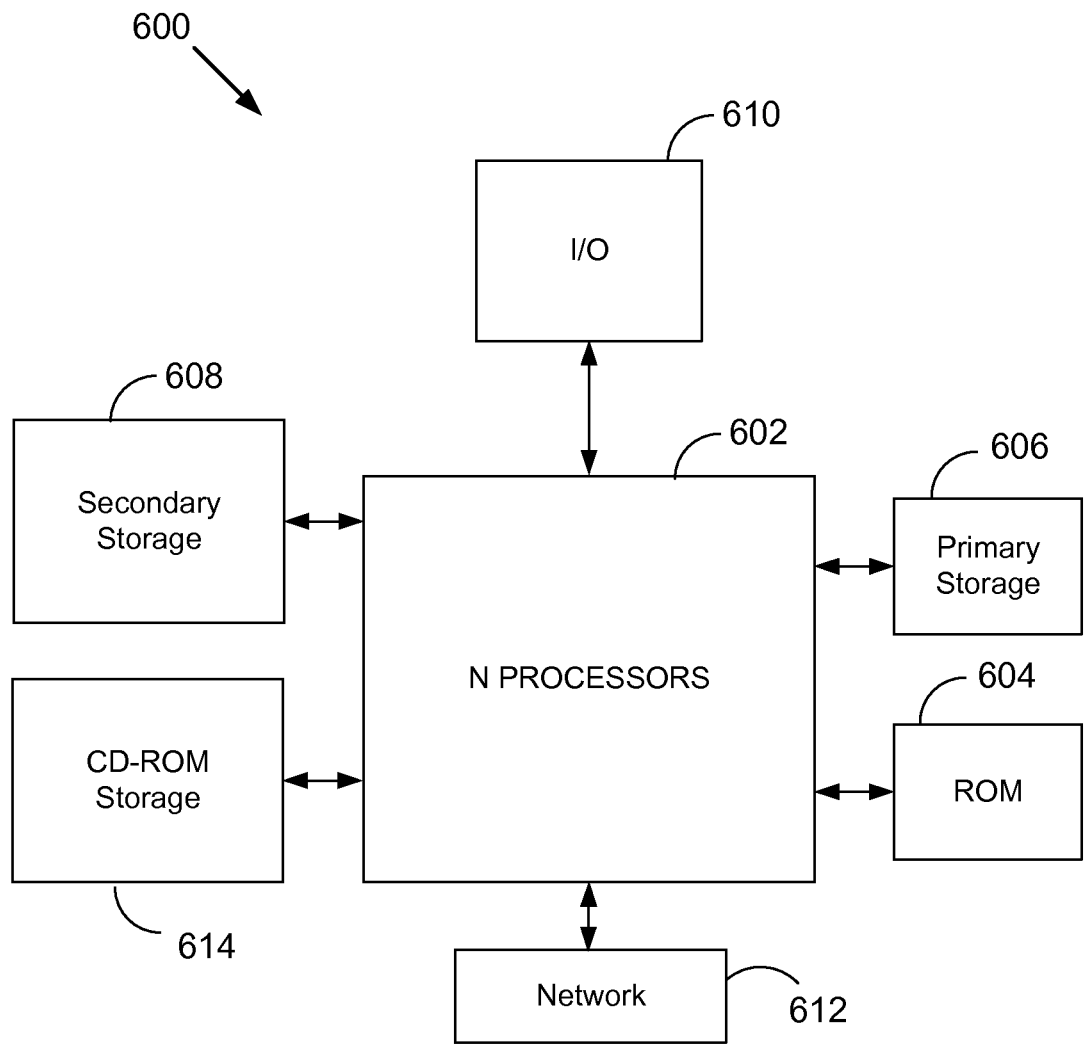
FIG. 6 illustrates a typical computer system that, when appropriately configured or designed, may serve as a computer system 600 for which the present invention may be embodied.

FIG. 6 illustrates a typical computer system that, when appropriately configured or designed, may serve as a computer system 600 for which the present invention may be embodied.

Computer system 600 includes a quantity of processors 602 (also referred to as central processing units, or CPUs) that may be coupled to storage devices including a primary storage 606 (typically a random access memory, or RAM), a primary storage 604 (typically a read-only memory, or ROM). CPU 602 may be of various types including microcontrollers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general purpose microprocessors. As is well known in the art, primary storage 604 acts to transfer data and instructions uni-directionally to the CPU and primary storage 606 typically may be used to transfer data and instructions in a bi-directional manner. The primary storage devices discussed previously may include any suitable computer-readable media such as those described above. A mass storage device 608 may also be coupled bi-directionally to CPU 602 and provides additional data storage capacity and may include any of the computer-readable media described above. Mass storage device 608 may be used to store programs, data and the like and typically may be used as a secondary storage medium such as a hard disk. It will be appreciated that the information retained within mass storage device 608, may, in appropriate cases, be incorporated in standard fashion as part of primary storage 606 as virtual memory. A specific mass storage device such as a CD-ROM 614 may also pass data uni-directionally to the CPU.

CPU 602 may also be coupled to an interface 610 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 602 optionally may be coupled to an external device such as a database or a computer or telecommunications or internet network using an external connection shown generally as a network 612, which may be implemented as a hardwired or wireless communications link using suitable conventional technologies. With such a connection, the CPU might receive information from the network, or might output information to the network in the course of performing the method steps described in the teachings of the present invention.

Figure 7A:
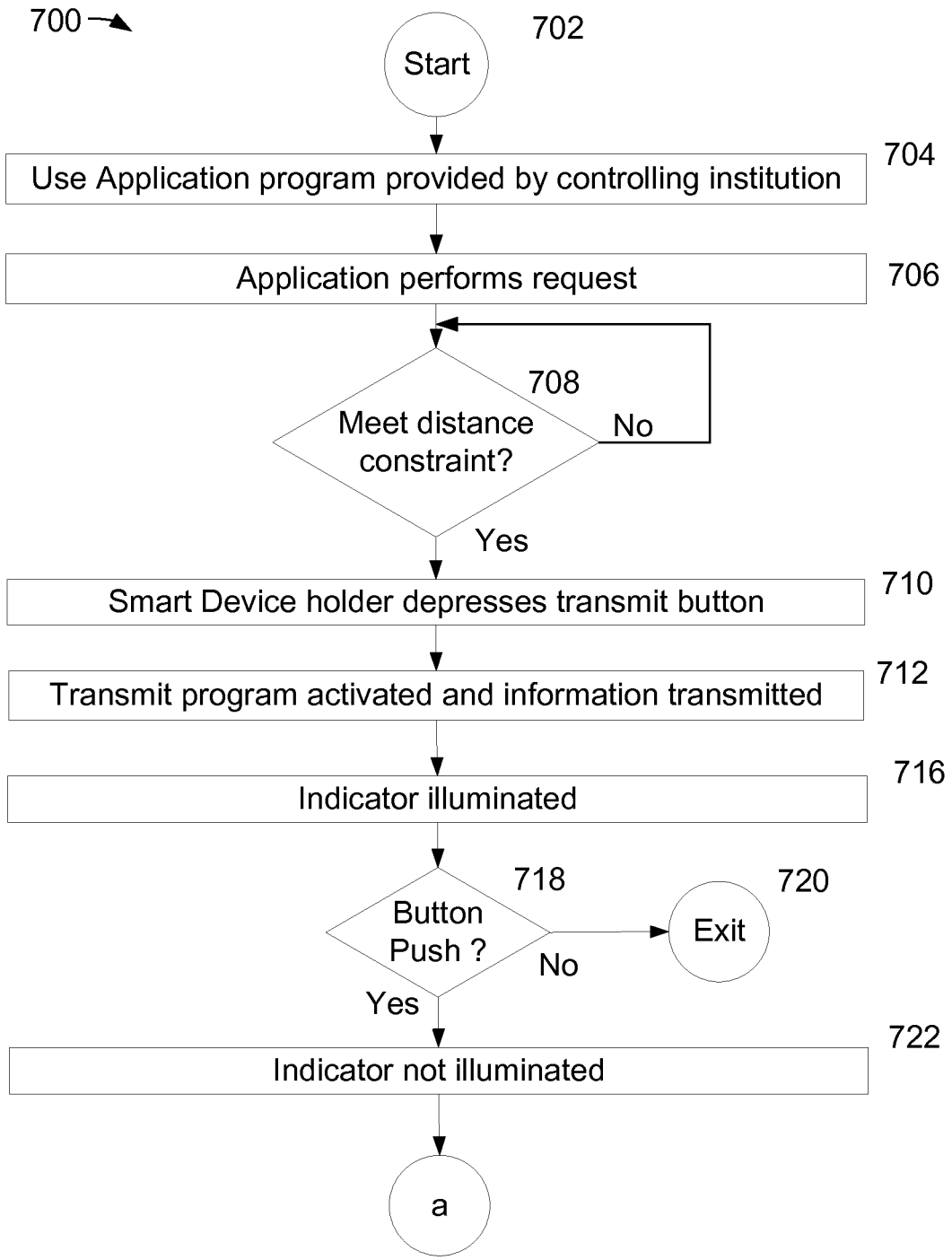
FIGS. 7A-B illustrate an example method for the communication system as described with reference to FIGS. 1-3, in accordance with an embodiment of the present invention.
Figure 7B:
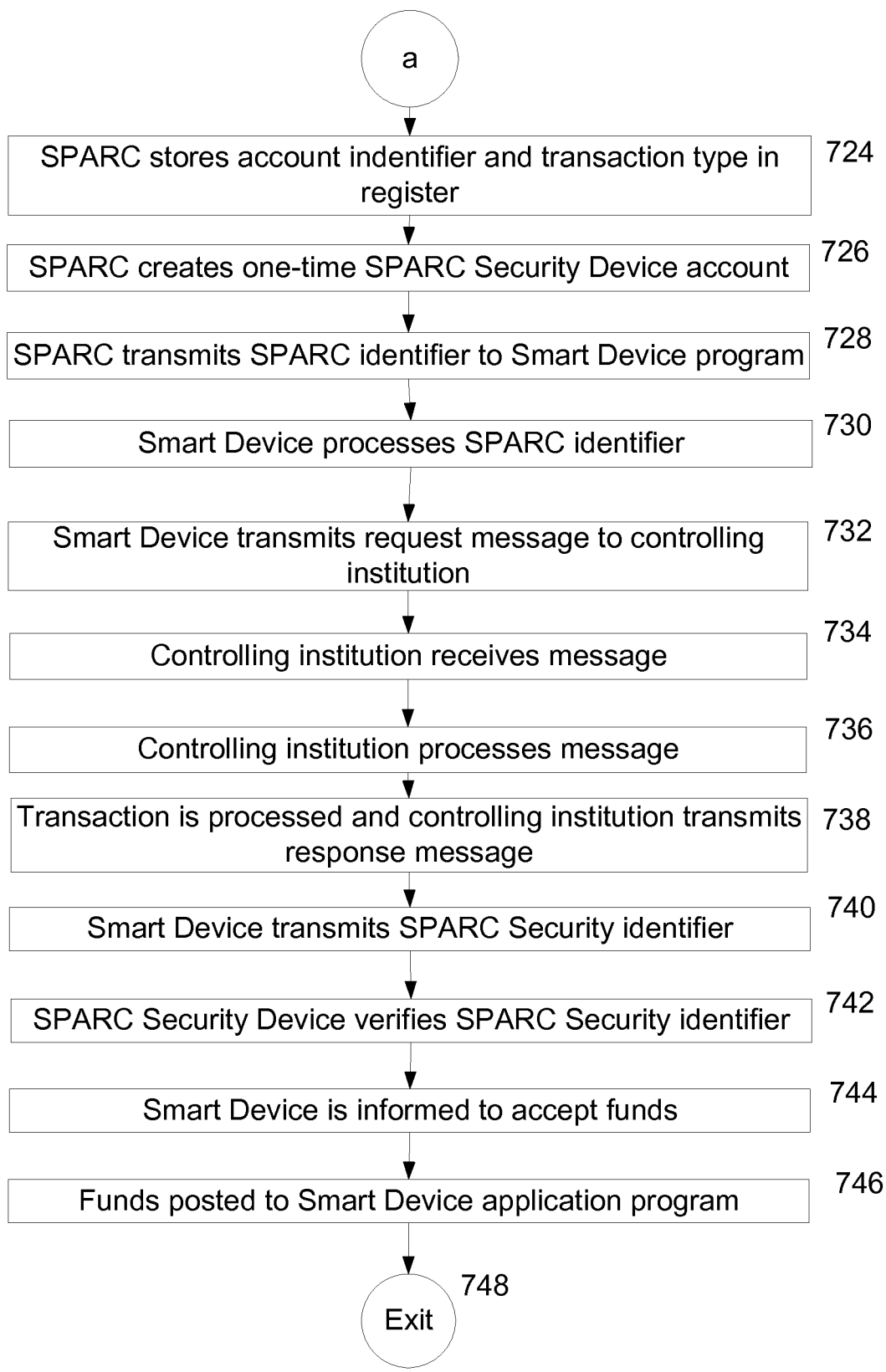

FIGS. 7A-B illustrate an example method for the communication system as described with reference to FIGS. 1-3, in accordance with an embodiment of the present invention.

Referring to FIG. 7A, a method 700 initiates in a step 702.

Then in a step 704, Smart Device uses application program provided by controlling institution.

As a non-limiting example, Smart Device 102 (FIG. 1) initiates operation of application provided by Application Controlling Institute 101 (FIG. 1).

Referring to FIG. 7A, then in a step 706 application performs request.

As a non-limiting example, Smart Device 102 (FIG. 1) transmits a request for crediting Smart Device 102 funds of $200 from Application Controlling Institute 101 (FIG. 1). Non-limiting examples of information communicated include account identifier, institution designation, transaction type (e.g. funds request), requested funds amount, currency type (e.g. U.S. Dollars), requesting Smart Device communications address and transaction password provided for routine security.

Referring to FIG. 7A, then in a step 708 a determination is performed whether a distance constraint is met.

As a non-limiting example, the distance between SPARC Security Device 104 (FIG. 1) is determined to be within a distance constraint with respect to Smart Device 102 (FIG. 1). As a non-limiting example, the devices may be required to be less than Near Field Communications (NFC) or 4 inches.

Referring to FIG. 7A, then in a step 710 person holding Smart Device depresses transmit button.

As a non-limiting example, a person (not shown) depresses button/sensor portion 110 (FIG. 1).

Referring to FIG. 7A, then in a step 712 transmit program is activated and information is transmitted.

As a non-limiting example, program for transmitting information from Smart Device 102 (FIG. 1) to SPARC Security Device 104 (FIG. 1) is activated and information is transmitted from Smart Device 102 (FIG. 1) to SPARC Security Device 104 (FIG. 1). Non-limiting examples of information transmitted include activate indicator portion 116 (FIG. 1), select button/sensor portion 110 (FIG. 1), deactivate indicator portion 116 (FIG. 1), account identifier and transaction type.

Referring to FIG. 7A, then in a step 716 indicator is illuminated.

As a non-limiting example, indicator portion 116 (FIG. 1) is activated.

Referring to FIG. 7A, then in a step 718 a determination for selecting button is performed.

As a non-limiting example, a determination for selection of button/sensor portion 110 (FIG. 1) is performed.

Referring to FIG. 7A, then for a determination of not pushing the button in step 718, execution of method 700 is terminated in a step 720.

As a non-limiting example, for a determination of not selecting button/sensor portion 110 (FIG. 1), execution of method 700 is terminated in step 720.

For a determination of pushing the button in step 718, in a step 722 indicator is not illuminated.

As a non-limiting example, indicator portion 116 (FIG. 1) is deactivated.

Referring to FIG. 7B, then in a step 724 SPARC stores account identifier and transaction type in register.

As a non-limiting example, SPARC Security Device 104 (FIG. 1) stores account identifier and transaction type in register.

Referring to FIG. 7B, then in a step 726 SPARC creates one-time SPARC Security Device account.

As a non-limiting example, SPARC Security Device 104 (FIG. 1) creates one-time SPARC Security Device account identifier. As a non-limiting example, account identifier includes SPARC transaction code, SPARC unit number, date, time and SPARC Security Device transaction identifier.

Referring to FIG. 7B, then in a step 728 SPARC transmits SPARC identifier to Smart Device program.

As a non-limiting example, SPARC Security Device 104 (FIG. 1) transmits SPARC identifier to program executing on Smart Device 102 (FIG. 1).

Referring to FIG. 7B, then in a step 730 Smart Device processes SPARC identifier.

As a non-limiting example, Smart Device 102 (FIG. 1) replaces account identifier in request message with SPARC identifier.

Referring to FIG. 7B, then in a step 732 Smart Device transmits request message to controlling institution.

As a non-limiting example, Smart Device 102 (FIG. 1) transmits request message to Application Controlling Institute 101 (FIG. 1)

Referring to FIG. 7B, then in a step 734 controlling institution receives message.

As a non-limiting example, Application Controlling Institute 101 (FIG. 1) receives message from Smart Device 102 (FIG. 1).

Referring to FIG. 7B, then in a step 736 controlling institution processes message.

As a non-limiting example, Application Controlling Institute 101 (FIG. 1), recognizes SPARC transaction code and uses SPARC unit identifier for database lookup. Furthermore, result of lookup provides transaction identifier. Furthermore, transaction identifier comparison validates message. In some embodiments, program may validate date and time for further validation processing. Furthermore, database provides account identifier for transaction processing. The primary purpose of the database is to store the true account number corresponding to the SSD ID Number. In some alternate embodiments, a non-limiting additional use of the ACI data base is to store a "Personal Profile" and "Preferences" for the SSD user. The Personal Profile describes the physical, educational and societal background of the SSD user. The Preferences section is a non-limiting list the data streams to which the user wants to stay up to date. Non-limiting examples include Google Alerts®, select stock markets, and Google Ads®. Including the results of these additional data streams offers a revenue opportunity to the ACI and an improved data flow for the SSD user.

Referring to FIG. 7B, then in a step 738 transaction is processed and controlling institution transmits response message.

As a non-limiting example, Application Controlling Institute 101 (FIG. 1) processes message and generates a response message. As a non-limiting example, response message includes SPARC Security Device identifier in order for Smart Device 102 (FIG. 1) to perform validation.

Referring to FIG. 7B, then in a step 740 Smart Device transmits SPARC Security identifier.

As a non-limiting example, Smart Device 102 (FIG. 1) transmits the received SPARC Security Device identifier to the SPARC Security Device 104 (FIG. 1) for evaluation.

Referring to FIG. 7B, then in a step 742 SPARC Security Device verifies SPARC Security identifier.

As a non-limiting example, SPARC Security Device 104 (FIG. 1) establishes the received unit identifier is correct.

Referring to FIG. 7B, then in a step 744 Smart Device is informed to accept funds.

As a non-limiting example, SPARC Security Device 104 (FIG. 1) informs Smart Device 102 (FIG. 1) to accept the funds.

Referring to FIG. 7B, then in a step 746 funds are posted to Smart Device application program.

As a non-limiting example, funds are posted to the application program associated with Smart Device 102 (FIG. 1).

Referring to FIG. 7B, then in a step 748 execution of method 700 terminates.

FIGS. 7A-B illustrate an example method for the communication system as described with reference to FIGS. 1-3 where an Application Controlling Institute, Smart Device and SPARC Security Device communicate and process information for performing a transaction.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention. Thus, some alternate embodiments of the present invention may be configured to comprise a smaller subset of the foregoing means for and/or steps described that the applications designer will selectively decide, depending upon the practical considerations of the particular implementation, to carry out and/or locate within the jurisdiction of the USA. For example, any of the foregoing described method steps and/or system components which may be performed remotely over a network (e.g., without limitation, a remotely located server) may be performed and/or located outside of the jurisdiction of the USA while the remaining method steps and/or system components (e.g., without limitation, a locally located client) of the forgoing embodiments are typically required to be located/performed in the USA for practical considerations. In client-server architectures, a remotely located server typically generates and transmits required information to a US based client, for use according to the teachings of the present invention. Depending upon the needs of the particular application, it will be readily apparent to those skilled in the art, in light of the teachings of the present invention, which aspects of the present invention can or should be located locally and which can or should be located remotely. Thus, for any claims construction of the following claim limitations that are construed under 35 USC §112 (6) it is intended that the corresponding means for and/or steps for carrying out the claimed function are the ones that are locally implemented within the jurisdiction of the USA, while the remaining aspect(s) performed or located remotely outside the USA are not intended to be construed under 35 USC §112 (6). In some embodiments, the methods and/or system components which may be located and/or performed remotely include, without limitation: servers and global communication network.

It is noted that according to USA law, all claims must be set forth as a coherent, cooperating set of limitations that work in functional combination to achieve a useful result as a whole. Accordingly, for any claim having functional limitations interpreted under 35 USC §112 (6) where the embodiment in question is implemented as a client-server system with a remote server located outside of the USA, each such recited function is intended to mean the function of combining, in a logical manner, the information of that claim limitation with at least one other limitation of the claim. For example, in client-server systems where certain information claimed under 35 USC §112 (6) is/(are) dependent on one or more remote servers located outside the USA, it is intended that each such recited function under 35 USC §112 (6) is to be interpreted as the function of the local system receiving the remotely generated information required by a locally implemented claim limitation, wherein the structures and or steps which enable, and breath life into the expression of such functions claimed under 35 USC §112 (6) are the corresponding steps and/or means located within the jurisdiction of the USA that receive and deliver that information to the client (e.g., without limitation, client-side processing and transmission networks in the USA). When this application is prosecuted or patented under a jurisdiction other than the USA, then "USA" in the foregoing should be replaced with the pertinent country or countries or legal organization(s) having enforceable patent infringement jurisdiction over the present application, and "35 USC §112 (6)" should be replaced with the closest corresponding statute in the patent laws of such pertinent country or countries or legal organization(s).

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Having fully described at least one embodiment of the present invention, other equivalent or alternative methods of remote authorization according to the present invention will be apparent to those skilled in the art. The invention has been described above by way of illustration, and the specific embodiments disclosed are not intended to limit the invention to the particular forms disclosed. For example, the particular implementation of the Smart Device may vary depending upon the particular type of computing device used. The computing devices described in the foregoing were directed to smartphone device implementations; however, similar techniques using laptop computing device implementations of the present invention are contemplated as within the scope of the present invention. The invention is thus to cover all modifications, equivalents, and alternatives falling within the spirit and scope of the following claims.

Claim elements and steps herein may have been numbered and/or lettered solely as an aid in readability and understanding. Any such numbering and lettering in itself is not intended to and should not be taken to indicate the ordering of elements and/or steps in the claims.

What is claimed is:

1. A system comprising:
a security device unit comprising:
a housing;
means for communicating wirelessly using technology to limit a separable distance for operation;
a processor for:
verifying a validity of a request for a transaction;
issuing an alert of receiving a valid request;
acknowledging a user's indication of an acceptance of the request;
generating a first one-time identifier, upon the acknowledgment, the first one-time identifier at least comprising a security device identification, a transaction number, a date and a time;
storing the request and transaction number to form an audit trail;
incrementing the transaction number for each subsequent transaction;
instructing said communicating means to communicate the first one-time identifier;
verifying a validity of a second one-time identifier for a processed transaction; and
instructing said communicating means to communicate an acceptance of the transaction upon the second one-time identifier being validated;
an indicator for receiving the alert from said processor to alert the user; and
a sensor for receiving the user's indication of an acceptance and transmitting the indication to said processor;
an application programmable device executing an application, said application programmable device for:
communicating with said communicating means;
communicating the request for the transaction to said communicating means;
receiving the first one-time identifier from said communicating means;
verifying a validity of the security device identification;
sending the first one-time identifier and transaction for processing, upon verification of the validity;
receiving a second one-time identifier indicating the transaction processed; and
communicating the second one-time identifier to said security device; and
an application controlling institute for:
communicating with said application programmable device;
supplying the application to said application programmable device;
receiving the first one-time identifier and transaction for processing;
verifying a validity of the first one-time identifier;
processing the transaction using the security device identification to determine account information, upon verification of the validity;
generating the second one-time identifier; and
sending the second one-time identifier to said application programmable device, wherein said security device, application programmable device, and application controlling institute securely process the transaction.

2. The system as recited in claim 1, in which said security device further comprises means, joined to said housing, for attaching said security device to an article for transportation.

* * * * *